(12) United States Patent
Sugimoto

(10) Patent No.: US 8,770,734 B2
(45) Date of Patent: Jul. 8, 2014

(54) WATER-BASED INK FOR INK-JET RECORDING, INK CARTRIDGE, INK-JET RECORDING METHOD, METHOD FOR PREVENTING CORROSION OF METAL MEMBER, METHOD FOR PRODUCING WATER-BASED INK FOR INK-JET RECORDING, AND INK-JET RECORDING APPARATUS

(75) Inventor: Junichiro Sugimoto, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 225 days.

(21) Appl. No.: 13/359,562

(22) Filed: Jan. 27, 2012

(65) Prior Publication Data
US 2012/0218344 A1 Aug. 30, 2012

(30) Foreign Application Priority Data
Feb. 28, 2011 (JP) ................................. 2011-042485

(51) Int. Cl.
*G01D 11/00* (2006.01)
*C09D 1/00* (2006.01)

(52) U.S. Cl.
USPC .......................................... 347/100; 106/31.6

(58) Field of Classification Search
USPC .......................................... 347/100; 106/31.6
See application file for complete search history.

(56) References Cited

U.S. PATENT DOCUMENTS

| | | | |
|---|---|---|---|
| 7,097,698 B2 * | 8/2006 | Soga et al. | 347/100 |
| 7,235,126 B2 | 6/2007 | Tani et al. | |
| 2002/0005885 A1 | 1/2002 | Katsuragi et al. | |
| 2004/0259978 A1 | 12/2004 | Tani et al. | |
| 2008/0241398 A1 | 10/2008 | Kato et al. | |
| 2009/0258196 A1 * | 10/2009 | Nagashima et al. | 106/31.85 |

FOREIGN PATENT DOCUMENTS

| | | |
|---|---|---|
| JP | 2002-012805 | 1/2002 |
| JP | 2003-096364 | 4/2003 |
| JP | 2005-008725 | 1/2005 |
| JP | 2008-246821 | 10/2008 |

* cited by examiner

*Primary Examiner* — Jannelle M Lebron
(74) *Attorney, Agent, or Firm* — Banner & Witcoff, Ltd.

(57) ABSTRACT

There is provided a water-based ink for ink-jet recording including: a self-dispersible carbon black modified by carboxylic acid group; water; and a water-soluble organic solvent, wherein oxalate ion is contained in the water-based ink in a amount of not more than 45 ppm by weight.

18 Claims, 2 Drawing Sheets

WATER-BASED INK FOR INK-JET RECORDING, INK CARTRIDGE, INK-JET RECORDING METHOD, METHOD FOR PREVENTING CORROSION OF METAL MEMBER, METHOD FOR PRODUCING WATER-BASED INK FOR INK-JET RECORDING, AND INK-JET RECORDING APPARATUS

CROSS REFERENCE TO RELATED APPLICATION

The present application claims priority from Japanese Patent Application No. 2011-042485, filed on Feb. 28, 2011, the disclosure of which is incorporated herein by reference in its entirety.

BACKGROUND OF THE INVENTION

1. Field of the Invention

The present invention relates to a water-based ink for ink-jet recording, an ink cartridge, an ink jet recording method, a method for preventing corrosion of a metal member (metal part or component), a method for producing a water-based ink for ink-jet recording, and an ink-jet recording apparatus.

2. Description of the Related Art

In the ink jet recording, a water-based ink using a self-dispersible carbon black is used in some cases. Since the self-dispersible carbon black does not require any polymeric pigment dispersant, the self-dispersible carbon black is capable of preventing the viscosity of the water-based ink from increasing, and has excellent jetting stability and storage stability. A self-dispersible carbon black, which is modified in particular with the sulfonate group, has a satisfactory dispersion stability of the pigment for a long period of time, and thus such self-dispersible carbon black is widely used. The self-dispersible carbon black modified by the sulfonate group has, however, unsatisfactory water resistance. Therefore, it is desired to use a self-dispersible carbon black modified by the carboxylic acid group which has excellent water resistance.

In a water-based ink for ink-jet recording using the self-dispersible carbon black modified by the carboxylic acid group, however, there is a fear that corrosion might occur in a metal member, in an ink-jet recording apparatus, which comes into contact with the water-based ink for ink-jet recording.

SUMMARY OF THE INVENTION

In view of the above, an object of the present teaching is to provide a water-based ink for ink jet recording having excellent water resistance and capable of lowering or preventing the corrosion of a metal member, in an ink-jet recording apparatus, which comes into contact with the water-based ink for ink jet recording.

According to a first aspect of the present teaching, there is provided a water-based ink for ink jet recording including: a self-dispersible carbon black modified by carboxylic acid group; water; and a water-soluble organic solvent, wherein oxalate ion is contained in the water-based ink in a amount of not more than 45 ppm by weight.

According to a second aspect of the present teaching, there is provided an ink cartridge including the water-based ink for ink-jet recording as defined in the first aspect.

According to a third aspect of the present teaching, there is provided an ink jet recording method which performs recording on a recording medium including: preparing the water-based ink for ink-jet recording as defined in the first aspect; and discharging the water-based ink to the recording medium.

According to a fourth aspect of the present teaching, there is provided a method for preventing corrosion of a metal member, of an ink-jet recording apparatus, which contacts with a water-based ink for ink jet recording, the method including: preparing the water-based ink containing a self-dispersible carbon black modified by carboxylic acid group, water, and a water-soluble organic solvent; and bringing the water-based ink into contact with the metal member, wherein oxalate ion is contained in the water-based ink in a amount of not more than 45 ppm by weight.

According to a fifth aspect of the present teaching, there is provided a method for producing a water-based ink for ink-jet recording, the method including: refining a carboxylic acid group-modified self-dispersible carbon black dispersion so that oxalate ion is contained in the water-based ink in a amount of not more than 45 ppm by weight; and mixing the carboxylic acid group-modified self-dispersible carbon black dispersion after refining, water, and a water-soluble organic solvent.

According to a sixth aspect of the present teaching, there is provided an ink jet recording apparatus, including: an ink cartridge accommodating section in which the ink cartridge as defined in the second aspect is accommodated; an ink discharge mechanism which discharges the water-based ink of the ink cartridge; and a metal member which contacts with the water-based ink for ink jet recording.

DESCRIPTION OF THE PREFERRED EMBODIMENTS

Figure 1:
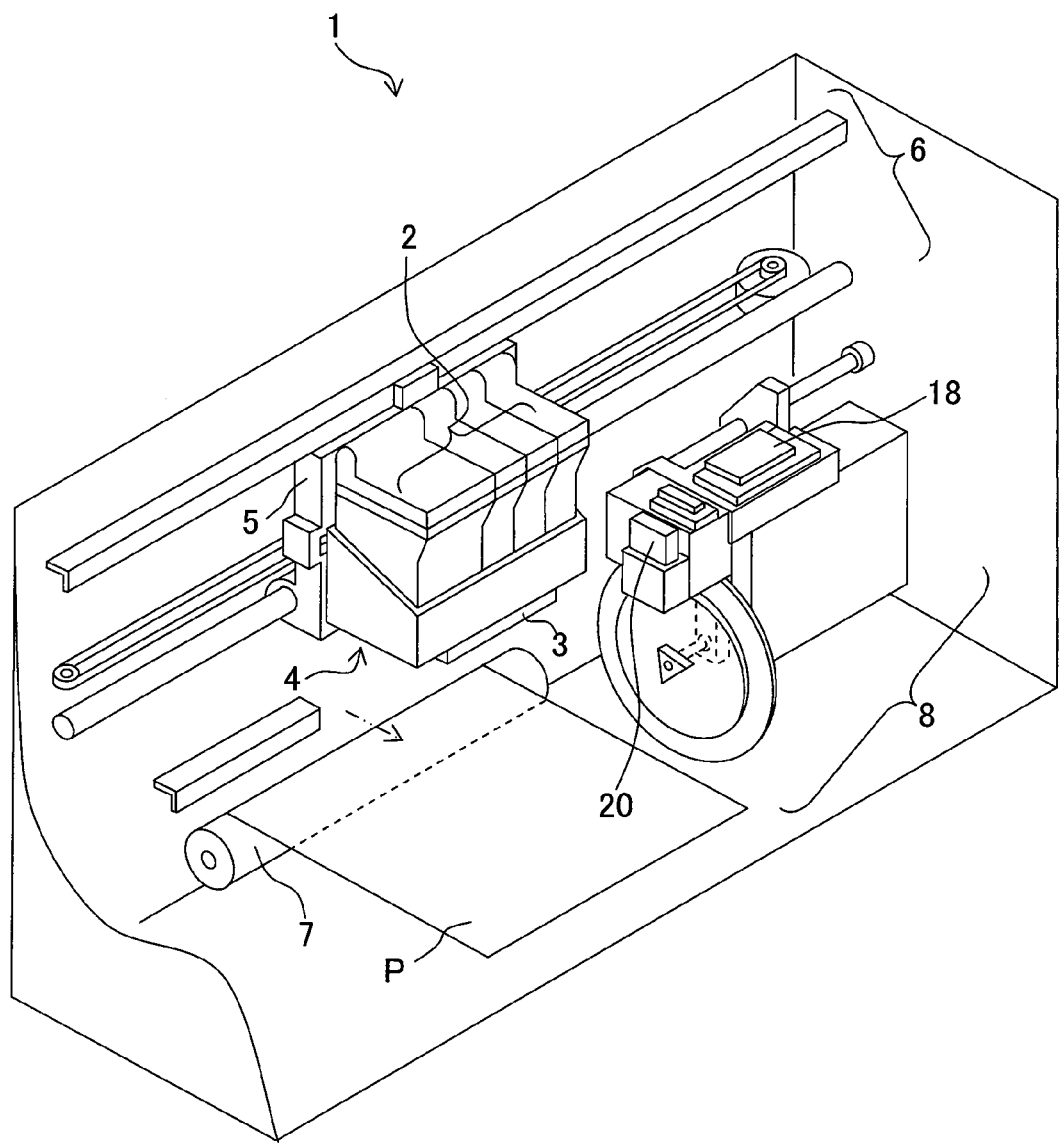
FIG. 1 is a schematic perspective view showing an example of the construction of an ink jet recording apparatus.

An explanation will be made about a water-based ink for ink-jet recording (hereinafter referred to simply as "water-based ink" or "ink") of the present teaching. The water-based ink of the present teaching contains a colorant, water, and a water-soluble organic solvent. As described above, the colorant includes the carboxylic acid group-modified self-dispersible carbon black. As the carboxylic acid group-modified self-dispersible carbon black, for example, a commercially available product may be used. The commercially available product is exemplified by "CAB-O-JET (trade name) 300" produced by Cabot Specialty Chemicals, etc. The water-based ink may contain a polymeric pigment dispersant; or it is allowable that the water-based ink does not contain any polymeric pigment dispersant. In a case that the water-based ink contains the polymeric pigment dispersant, it is preferable that the polymeric pigment dispersant is contained in the ink in an amount to an extent not affecting the viscosity of the water-based ink. As described above, since the water-based ink of the present teaching uses the self-dispersible pigment as described above, there is not any problem of the increase in viscosity which would be otherwise caused by the polymeric pigment dispersant; and the water-based ink of the present teaching has excellent jetting stability and storage stability.

The solid content blending amount (pigment solid content) of the carboxylic acid group-modified self-dispersible carbon black with respect to the entire water-based ink is not particularly limited, and may be appropriately determined based on, for example, desired optical density or color (hue, tint), etc.

The pigment solid content is, for example, 0.1% by weight to 20% by weight, is preferably 1% by weight to 10% by weight, and is more preferably 2% by weight to 8% by weight.

The colorant may include a pigment, a dye, etc., which is/are different from the carboxylic acid group-modified self-dispersible carbon black, in addition to the carboxylic acid group-modified self-dispersible carbon black.

The water is preferably ion-exchanged water or pure water (purified water). The blending amount of the water with respect to the entire water-based ink (water ratio) is, for example, 10% by weight to 90% by weight, and is preferably 40% by weight to 80% by weight. The water ratio may be balance of other components.

The water-soluble organic solvent includes, for example, a humectant which prevents the water-based ink from drying at an end of the nozzle in the ink-jet head and a penetrant which adjusts the drying speed of the water-based ink on a recording medium.

The humectant is not particularly limited, and includes, for example, lower alcohols such as methyl alcohol, ethyl alcohol, n-propyl alcohol, isopropyl alcohol, n-butyl alcohol, sec-butyl alcohol, and tert-butyl alcohol; amides such as dimethylformamide and dimethylacetamide; ketones such as acetone; ketoalcohols (ketone alcohols) such as diacetone alcohol; ethers such as tetrahydrofuran and dioxane; polyvalent alcohols such as polyalkylene glycols, alkylene glycols, and glycerol; 2-pyrrolidone; N-methyl-2-pyrrolidone; and 1,3-dimethyl-2-imidazolidinone. The polyalkylene glycol includes, for example, polyethylene glycol and polypropylene glycol. The alkylene glycol includes, for example, ethylene glycol, propylene glycol, butylenes glycol, diethylene glycol, triethylene glycol, dipropylene glycol, tripropylene glycol, thiodiglycol, and hexylene glycol. It is allowable that only one type of the humectant as described above is used, or two or more types of the humectants are used. Among the above-described humectants, it is preferable to use polyvalent alcohols such as alkylene glycol and glycerol.

The blending amount of the humectant with respect to the entire water-based ink is, for example, 0% by weight to 95% by weight, is preferably 5% by weight to 80% by weight, and is more preferably 5% by weight to 50% by weight.

The penetrant includes, for example, glycol ether. The glycol ether includes, for example, ethylene glycol methyl ether, ethylene glycol ethyl ether, ethylene glycol-n-propyl ether, diethylene glycol methyl ether, diethylene glycol ethyl ether, diethylene glycol-n-propyl ether, diethylene glycol-n-butyl ether, diethylene glycol-n-hexyl ether, triethylene glycol methyl ether, triethylene glycol ethyl ether, triethylene glycol-n-propyl ether, triethylene glycol-n-butyl ether, propylene glycol methyl ether, propylene glycol ethyl ether, propylene glycol-n-propyl ether, propylene glycol-n-butyl ether, dipropylene glycol methyl ether, dipropylene glycol ethyl ether, dipropylene glycol-n-propyl ether, dipropylene glycol-n-butyl ether, tripropylene glycol methyl ether, tripropylene glycol ethyl ether, tripropylene glycol-n-propyl ether, and tripropylene glycol-n-butyl ether. It is allowable that only one type of the penetrant as described above is used, or two or more types of the penetrants are used.

The blending amount of the penetrant with respect to the entire water-based ink is, for example, 0% by weight to 20% by weight, is preferably 0.1% by weight to 15% by weight, and is more preferably 0.5% by weight to 10% by weight.

The concentration of the oxalate ion (oxalate ion concentration) in the water-based ink is not more than 45 ppm by weight, as described above. By making the oxalate ion weight concentration be not more than 45 ppm, it is possible to lower or prevent the corrosion of a metal member, in or of the ink jet recording apparatus, which comes into contact with the water-based ink, and in particular possible to effectively prevent the corrosion of a metal member containing or including nickel. The metal member can be exemplified, for example, by a metal member in or of an ink jet head (for example, a filter, an ink channel inside the ink jet head, etc.), an ink channel up to the ink-jet head, etc. Further, according to the present teaching, it is possible to lower or prevent the corrosion of the metal member coming into contact with the water-based ink in the ink jet recording apparatus; and thus it is also possible to prevent clogging (blockage) of the ink channel which would be otherwise caused by the corrosion (adhesion of the pigment), etc. It is preferable that the oxalate ion concentration is as low as possible, and the lower limit is not particularly limited, which is for example 0 (measureable limit). A method for adjusting the oxalate ion concentration is, for example, as indicated in a method for producing the water-based ink which will be described later on. On the other hand, in view of operation efficiency of oxalate ion removal and dispersion stability of the water-based ink, the oxalate ion concentration is preferably not less than 1 ppm by weight. When the oxalate ion concentration is lower than 1 ppm, a oxalate ion removal operation, as will be described later on, is required to be repeated. Thus, a lot of effort is required. Further, by repeating the oxalate ion removal operation, the dispersion stability of the pigment, self-dispersible carbon black modified by the carboxylic acid group, is decreased in some cases. With all things considered, the oxalate ion concentration in the water-based ink is preferably 1 ppm to 45 ppm by weight.

The water-based ink which uses the carboxylic acid group-modified self-dispersible carbon black tends to corrode the metal member. In the corroded metal member, since a corroded portion of the metal (metal member) is colored, it is assumed that the corrosion is caused by the carboxylic acid group-modified self-dispersible carbon black and that the carboxylic acid group on the surface of the pigment is involved. The inventors found out, through a series of diligent research and study, that oxalic acid generated when carboxylic acid group is introduced into the surface of the carbon black is mixed in the water-based ink as a trace amount of oxalate ion and that the oxalate ion mixed in the water-based ink is a substance which promotes the corrosion of the metal by the carboxylic acid group-modified self-dispersible carbon black. Then, the inventors arrived at the present teaching that the corrosion of the metal member, which comes into contact with the water-based ink, in the ink jet recording apparatus, can be lowered or prevented by making the oxalate ion concentration in the water-based ink be not more than 45 ppm. Although the mechanism for the above-described corrosion-lowering effect or corrosion-preventing effect is not clear, it is assumed that the oxalate ion has any interaction with the carboxylic acid group-modified self-dispersible carbon black and the surface of the metal and promotes the adhesion of the carboxylic acid group-modified self-dispersible carbon black to the surface of the metal. Accordingly, even with respect to the water-based ink using the carboxylic acid group-modified self-dispersible carbon black, it is possible to obtain a water-based ink which hardly corrode the metal by making the oxalate ion concentration be not more than 45 ppm. Note that this effect is observed particularly in the water-based ink using the carboxylic acid group-modified self-dispersible carbon black. From this also, it is assumed that the oxalate ion and the carboxylic acid group-modified self-dispersible carbon black have any chemical interaction therebetween and affect the corrosion of the metal.

The water-based ink preferably further contains 1,2,3-benzotriazole. By containing 1,2,3-benzotriazole in the water-based ink, it is possible to greatly enhance the effect of lowering or preventing corrosion of the metal member contacting with the water-based ink in the ink-jet recording apparatus. The blending amount of 1,2,3-benzotriazole with respect to the entire water-based ink is, for example, 0.005% by weight to 5% by weight, is preferably 0.01% by weight to 1% by weight, is more preferably 0.05% by weight to 0.5% by weight, and is further more preferably 0.1% by weight to 0.3% by weight.

The water-based ink may further contain a conventionally known additive, if necessary. The additive includes, for example, surfactants, pH-adjusting agents, viscosity-adjusting agents, surface tension-adjusting agents, and fungicides. The viscosity-adjusting agents include, for example, polyvinyl alcohol, cellulose, water-soluble resin, etc.

The oxalate ion is an impurity mainly originating from the self-dispersible carbon black modified by the carboxylic acid group, as described above. The oxalate ion has a possibility of being contained (present), as the impurity, in various chemicals, pigments, water, etc. When the water-based ink is prepared by using a material having a low purity, unpurified material, the water-based ink contains the oxalate ion in a concentration of not less than 45 ppm in some cases. Accordingly, in order to make the oxalate ion concentration in the water-based ink be not more than 45 ppm, a material having a high purity or a purified material is used to prepare the water-based ink. The water-based ink can be produced, for example, by a method as follows. The following producing method, however, is merely an example, and it is not intended to limit the present teaching.

First, 10 g of pure water is placed in a ultrafiltration set (MACROSEP 10K OMEGA, produced by Pall Corporation; elimination limit molecule quantity: 1,000), the ultrafiltration set is placed in a centrifugal separator (HIMAC CT15D produced by Hitachi-Koki, Ltd.); and then the centrifugal separator is driven for 10 minutes at 10,000 rpm to thereby clean a filter of the ultrafiltration kit.

Then, after the cleaning, the pure water is discarded and 10 g of the carboxylic acid group-modified self-dispersible carbon black dispersion is placed in the ultrafiltration set; and then the centrifugal separator is driven, performing the centrifugal separation. Here, by changing the driving condition (rotational speed and rotational time) of the centrifugal separator, the oxalate ion concentration in the carboxylic acid group-modified self-dispersible carbon black is adjustable. Next, the carboxylic acid group-modified self-dispersible carbon black remaining on the filter of the ultrafiltration set is recovered and is dispersed again in pure water. By repeating the operation using the centrifugal separator and the re-dispersion operation, a required or necessary amount of dispersion of the carboxylic acid group-modified self-dispersible carbon black (carboxylic acid group-modified self-dispersible carbon black dispersion) is obtained.

On the other hand, components except for the carboxylic acid group-modified self-dispersible carbon black (the water and the water-soluble organic solvent, and optionally other additive component(s) as necessary) are mixed uniformly or homogeneously to obtain an ink solvent. With respect to the ink solvent, it is also allowable to adjust the oxalate ion concentration in a similar manner to that performed for the carboxylic acid group-modified self-dispersible carbon black dispersion. Alternatively, it is allowable to use, as the component(s) of the ink solvent, a super-high purity product(s). Subsequently, the ink solvent is added to the carboxylic acid group-modified self-dispersible carbon black dispersion for which the re-dispersion operation is performed, followed by being mixed uniformly in a publicly known method. Then, undissolved matters are removed by a filter or the like. As a method for removing the oxalate ion, it is possible to use, for example, a publicly known method such as the ion-exchange method and the oxalate ion absorption method using boehmite, etc., in addition to the ultrafiltration method described above.

As described above, the water-based ink of the present teaching uses the self-dispersible carbon black modified by the carboxylic acid group as the colorant. Thus, the water-based ink of the present teaching is excellent in water resistance. Further, the weight concentration of the oxalate ion in the water-based ink of the present teaching is made to be not more than 45 ppm. Thus, it is possible to lower or prevent the corrosion of the metal member, in the ink jet recording apparatus, coming into contact with the water-based ink for ink-jet recording.

Next, an explanation will be given about an ink cartridge of the present teaching. The ink cartridge of the present teaching is an ink cartridge which contains a water-based ink for ink jet recording, wherein the water-based ink is the water-based ink for ink jet recording of the present teaching. It is possible to use, as a body of the ink cartridge, a publicly known body of ink cartridge.

Next, an explanation will be given about an ink jet recording method of the present teaching. The ink jet recording method of the present teaching is an ink-jet recording method for performing recording by jetting a water-based ink for ink jet recording from an ink jet head, wherein the water-based ink for ink jet recording of the present teaching is used as the water-based ink. The ink jet-head may include a metal member.

The ink-jet recording method of the present teaching can be carried out, for example, by using an ink jet recording apparatus which carries the ink jet head including the metal member. The metal member includes or contains, for example, nickel, iron, chrome, etc. In particular, in a case that the metal member includes nickel, it is possible to effectively reduce or prevent the corrosion of nickel. The recording includes printing text (character, letter), printing image or picture, and printing, etc.

Next, an explanation will be made about the ink jet recording apparatus of the present teaching. An ink jet recording apparatus 1 shown in FIG. 1 includes four ink cartridges 2, an ink jet head (an ink discharge mechanism) 3 including a metal member, a head unit 4, a carriage 5, a driving unit 6, a platen roller 7, and a purge device 8 as main constitutive components or parts.

The four ink cartridges 2 contain four colors of water-based inks respectively, the four colors being yellow, magenta, cyan and black. For example, the water-based black ink is a water-based ink of the present teaching. As for the water-based inks other than the water-based black ink, general water-based inks may be used. The ink jet head 3 provided in the head unit 4 performs recording on a recording medium P (for example, recording paper sheet). The four ink cartridges 2 and the head unit 4 are provided or arranged on the carriage 5. The driving unit 6 reciprocates the carriage 5 in a linear direction. As the driving unit 6, it is possible to use, for example, a conventionally known driving unit (see, for example, Japanese Patent Application laid-open No. 2008-246821). The platen roller 7 extends in the reciprocating direction of the carriage 5 and is arranged to face or be opposite to the ink jet head 3.

Figure 2:
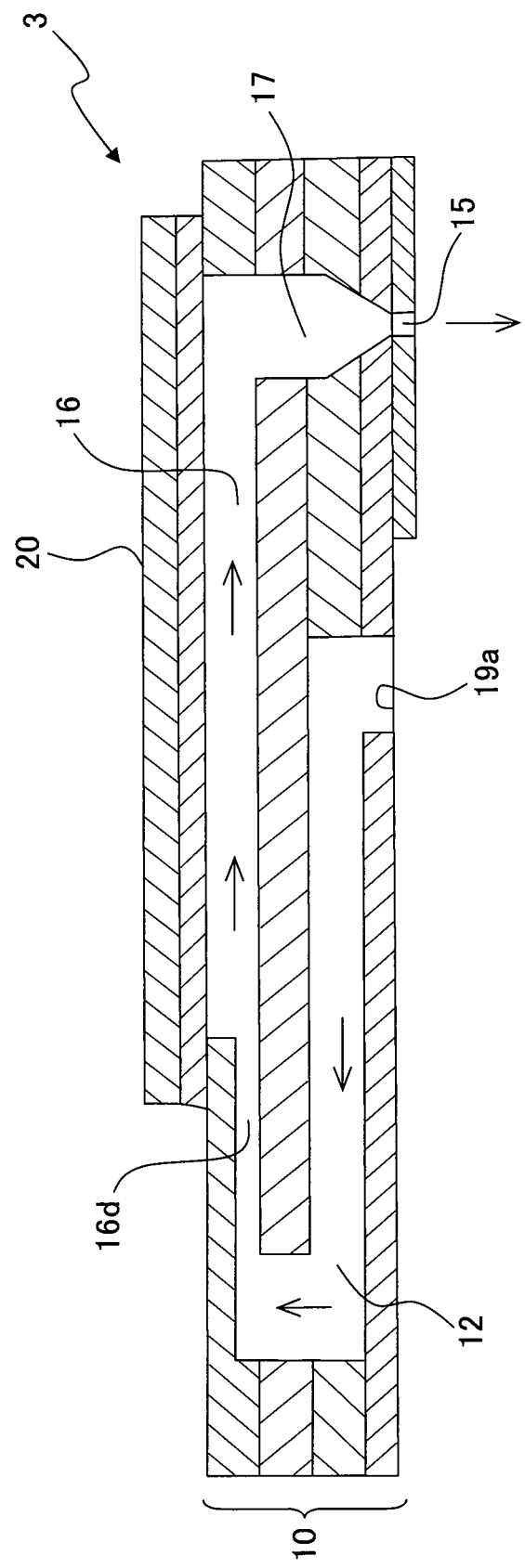
FIG. 2 is a schematic cross-sectional view of an ink-jet head included in the ink-jet recording apparatus.

As shown in FIG. 2, the ink jet head 3 is provided with a cavity plate 10 and a piezoelectric actuator 20. The cavity plate 10 is formed of a plurality of thin metal plates which include nickel. The cavity plate 10 has ink supply holes 19a connected with the ink cartridge 2 (FIG. 1), connecting tubes (manifolds) 12, narrowed portions 16d, pressure chambers 16, communication holes 17, and nozzles 15. These components communicate with each other to form the ink channel. Although the ink supply hole 19a opens toward the jetting direction of the nozzle 15 in FIG. 2 for convenience, the ink supply hole 19a actually opens toward the piezoelectric actuator 20. A plurality of pressure chambers 16 are provided in the ink-jet head 3. The nozzles 15 communicating the respective pressure chambers 16 are provided substantially in line in one surface of the ink-jet head 3. The water-based ink is supplied to the pressure chamber 16 from the ink-cartridge 2 upon passing through the ink supply hole 19a, the connecting tube (manifold) 12, and the narrowed portion 16d. Then, the piezoelectric actuator 20 applies the pressure to the ink in the pressure chamber 16 to jet or discharge the ink from the nozzle 15 upon passing through the communication hole 17.

The recording paper sheet P shown in FIG. 1 is supplied or fed from a paper feeding cassette or sheet feeding cassette (not shown) arranged at a side of or at a position below the ink jet recording apparatus 1. The recording paper sheet P is introduced or guided between the ink jet head 3 and the platen roller 7. Then, a predetermined recording is performed on the fed or introduced recording paper sheet P with the ink discharged or jetted from the ink-jet head 3. It is possible to reduce or prevent the corrosion of the metal member of the ink jet head 3 (that is, the corrosion of the cavity plate 10 in which the ink channel is formed, as shown in FIG. 2) by using the water-based ink of the present teaching which contains the oxalate ion in a concentration of not more than 45 ppm. The recording paper sheet P on which the recording has been performed is discharged from the ink jet recording apparatus 1. In FIG. 1, the paper feeding mechanism and discharging mechanism for the recording paper sheet P are omitted.

The purge device 8 sucks unsatisfactory or degraded ink which includes air bubbles etc., accumulated in the ink jet head 3. As the purge device 8, it is possible to use, for example, a conventionally known purge device (for example, see Japanese Patent Application laid-open No. 2008-246821).

A wiper member 20 is provided on the purge device 8, at a position on the side of the platen roller 7 such that the wiper member 20 is adjacent to the purge device 8. The wiper member 20 is formed to have a spatula form, and wipes a nozzle-formation surface of the ink-jet head 3 accompanying with the movement (reciprocating movement) of the carriage 5. In FIG. 1, a cap 18 is provided to cover a plurality of nozzles of the ink-jet head 3 which is returned to a reset position upon completion of the recording, so as to prevent the ink from drying.

In the ink-jet recording apparatus, the four ink cartridges may be provided on a plurality of carriages. Alternatively, the ink cartridges may be arranged and fixed inside the ink jet recording apparatus, rather than being provided on the carriage(s). In such an aspect, for example, the ink cartridges and the head unit which is provided on the carriage are connected with tubes, etc., and the inks are supplied from the ink cartridges to the head unit via the tubes.

The apparatus shown in FIG. 1 adopts the ink jet head of serial type. However, the present teaching is not limited to this. The ink jet recording apparatus may be an apparatus adopting a line-type ink jet head. According to the present teaching, there is provided an ink jet recording apparatus which includes an ink accommodating section and an ink-jet head and which jets an ink accommodated in the ink accommodating section by the ink jet head, wherein the ink jet head includes a metal member and the ink accommodating section accommodates a water-based ink of the present teaching.

Next, a method for preventing corrosion of a metal member of the present teaching will be explained. The method for preventing corrosion of the metal member of the present teaching is a method for preventing corrosion of the metal member, which comes into contact with the water-based ink, in the ink-jet recording apparatus using the water-based ink for ink-jet recording including the carboxylic acid group-modified self-dispersible carbon black, wherein the oxalate ion concentration in the water-based ink is not more than 45 ppm. Note that the phrase "preventing corrosion of metal member" is a concept including lowering (reducing) the corrosion of the metal member.

Next, a method for producing the water-based ink for ink jet recording of the present teaching will be explained. The method for producing the water-based ink for ink-jet recording of the present teaching includes refining the carboxylic acid group-modified self-dispersible carbon black dispersion so that the weight concentration of the oxalate ion in the water-based ink is not more than 45 ppm; and mixing the carboxylic acid group-modified self-dispersible carbon black dispersion after refining, water, and the water-soluble organic solvent. The refining the carboxylic acid group-modified self-dispersible carbon black dispersion preferably includes performing ultrafiltration for the carboxylic acid group-modified self-dispersible carbon black dispersion so that the weight concentration of the oxalate ion in the water-based ink is not more than 45 ppm. As the method for refining the carboxylic acid group-modified self-dispersible carbon black dispersion, in addition to the ultrafiltration method, it is possible to use, for example, a publicly known method for removing the oxalate ion, such as the ion-exchange method and the oxalate ion absorption method using boehmite etc. According to the method for producing the water-based ink for ink jet recording of the present teaching, it is possible to obtain the water-based ink for ink jet recording having excellent water resistance and capable of lowering or preventing the corrosion of the metal member, in the ink-jet recording apparatus, which contacts with the water-based ink for ink-jet recording.

In the ink jet recording method, the method for preventing corrosion of the metal member, and the method for producing the water-based ink for ink jet recording of the present teaching, it is possible to make the kind, blending amount, aspect, etc. of the respective components, such as the colorant, etc. be same as those of the water-based ink for ink jet recording of the present teaching.

EXAMPLES

Next, examples of the present teaching will be explained together with comparative examples and reference examples. Note that the present teaching is not limited to the examples, the comparative examples and the reference examples which will be described below.

Examples 1-11, Comparative Example 1 and Reference Examples 1, 2

First, 10 g of pure water was placed in a ultrafiltration set (MACROSEP 10K OMEGA, produced by Pall Corporation; elimination limit molecule quantity: 1,000), the ultrafiltration set was placed in a centrifugal separator (HIMAC CT15D produced by Hitachi-Koki, Ltd.); and then the centrifugal separator was driven for 10 minutes at 10,000 rpm to thereby clean a filter of the ultrafiltration set.

Then, after the cleaning, the pure water was discarded and 10 g of self-dispersible carbon black dispersion in water-base ink composition components (TABLE 1 and TABLE 2) was placed in the ultrafiltration set. Then, the centrifugal separator was driven, performing the centrifugal separation. Here, by changing the driving condition (rotational speed and rotational time) of the centrifugal separator, the oxalate ion concentration in the self-dispersible carbon black was adjusted. For example, in Example 2, the centrifugal separator was driven for 3 hours at 7,000 rpm. Next, the self-dispersible carbon black remaining on the filter of the ultrafiltration set was recovered and was dispersed again in pure water. By repeating the operation using the centrifugal separator and the re-dispersion operation, a required or necessary amount of dispersion of the self-dispersible carbon black (self-dispersible carbon black dispersion) was obtained.

On the other hand, components except for the self-dispersible carbon black dispersion, in the water-based ink composition components (TABLE 1 and TABLE 2), were mixed uniformly or homogeneously to obtain ink solvents. Subsequently, the ink solvents were each added to the self-dispersible carbon black dispersion for which the re-dispersion operation was performed, followed by being mixed uniformly. After that, obtained mixtures were each filtrated through a cellulose acetate membrane filter (pore size 3.00 μm) produced by Toyo Roshi Kaisha, Ltd., and thus water-based inks for ink-jet recording of Examples 1-11, Comparative Example 1, and Reference Examples 1, 2 were obtained. The oxalate ion concentration in each of the water-based inks of Examples 1-11, Comparative Example 1, and Reference Examples 1, 2 was measured by anion chromatography under the following condition. Measuring condition for oxalate ion concentration:

Measuring device: ICS-2000 (model name) produced by Dionex Corporation
Column: AS18 4 mm (model name), produced by Dionex Corporation
Guard column: AG18 4 mm (model name), produced by Dionex Corporation
Eluent: 5 mmol/L aqueous solution of potassium hydroxide
Flow rate: 1 mL/min
Column temperature: 30 degrees Celsius
Injection rate: 25 μL
Detection: Electric conductivity (Suppressor method)

Comparative Example 2 and Reference Example 3

Components except for the self-dispersible carbon black dispersion, in the water-based ink composition components (TABLE 2), were mixed uniformly or homogeneously to obtain ink solvents. Subsequently, the ink solvents were each added to the self-dispersible carbon black dispersion, followed by being mixed uniformly. After that, obtained mixtures were each filtrated through a cellulose acetate membrane filter (pore size 3.00 μm) produced by Toyo Roshi Kaisha, Ltd., and thus water-based inks for ink-jet recording of Comparative Example 2 and Reference Example 3 were obtained. The oxalate ion concentration in each of the water-based inks of Comparative Example 2 and Reference Example 3 was measured by the anion chromatography under the foregoing condition.

Comparative Example 3 and Reference Example 4

In Comparative Example 3, the oxalate ion concentration was adjusted by adding sodium oxalate to the water-based ink of Comparative Example 2. In Reference Example 4, the oxalate ion concentration was adjusted by adding the sodium oxalate to the water-based ink of Reference Example 3. The oxalate ion concentration in each of the inks of Comparative Example 3 and Reference Example 4 was measured by the anion chromatography under the foregoing condition.

(1) Immersion evaluation and (2) Evaluation of re-dispersion property of the ink were performed for the water-based inks obtained in the examples, comparative examples, and reference examples in accordance with the following method.

(1) Immersion Evaluation

A Ni—Co filter was immersed in each of the water inks of examples, comparative examples, and reference examples under the following conditions (a) to (c); and nickel elution amount (Ni elution amount) from the Ni—Co filter to each of the water-based inks was measured by using an ICP emission spectrophotometer CIROS-120EOP (model name) produced by Rigaku Corporation. Further, after the following immersion period of time was elapsed, the Ni—Co filter was taken out of each of the water-based inks, and the Ni—Co filter was observed visually and microscopically. The evaluation was made based on the results of visual and microscopic observations, in accordance with the following evaluation criterion.

Conditions for Immersion:
(a) Amount of each of the water-based inks of examples, comparative examples, and reference examples: 10 g
(b) Temperature of the water-based ink: 60 degrees Celsius
(c) Immersion period of time: 5 days Immersion Evaluation Evaluation Criterion:
G: No color change and no rust occurred in the Ni—Co filter
NG: Color change and rust occurred in the Ni—Co filter (2) Re-Dispersion Property of Ink The water based inks of the examples, comparative examples, and reference examples were dripped each in an amount of 12 μL onto preparations, respectively. Subsequently, the preparations were placed stationarily for 8 hours under an environment of temperature: 60° C., and thus the ink composition components were evaporated and dried. Next, 3 drops of pure water (about 0.1 mL) were dripped, onto each of the solid matters obtained after the storage to prepare evaluation samples. With respect to the evaluation samples prepared in such a manner, presence or absence of coarse particles and/or foreign matter(s) was observed by using a ×50-magnification optical microscope. The re-dispersion property was evaluated in accordance with the following evaluation criterion. The results thereof are shown in TABLES 1 and 2.

G: After dripping of the pure water, the solid matter was immediately re-dispersed (dissolved and dispersed in the pure water), and any coarse particles and/or foreign matter were not present.

NG: Coarse particles and/or foreign matter were present.

The compositions and the measurement and evaluation results of the water-based inks of Examples 1-11 are shown in TABLE 1. The compositions and the measurement and evaluation results of the water-based inks of Comparative Examples 1-3 and Reference Examples 1-4 are shown in TABLE 2.

TABLE 1

|  |  | Ink No. EX. 1 | EX. 2 | EX. 3 | EX. 4 |
|---|---|---|---|---|---|
| Ink composition | Carboxylic acid group-modified self-dispersible carbon black (*1) | 6.0 | 6.0 | 6.0 | 7.0 |
|  | Glycerol | 23.0 | 23.0 | 23.0 | 23.0 |
|  | Dipropylene glycol-n-propyl ether | 2.0 | 2.0 | 2.0 | 2.0 |
|  | 1,2,3-benzotriazole | — | — | — | — |
|  | Water | balance | balance | balance | balance |
| Oxalate ion (ppm) |  | 2 | 19 | 38 | 44 |
| Ni—Co filter Ni elution amount (ppm) |  | 8 | 8 | 10 | 12 |
| Ni—Co filter Observation |  | G | G | G | G |
| Re-dispersion property |  | G | G | G | G |

|  |  | Ink No. EX. 5 | EX. 6 | EX. 7 | EX. 8 |
|---|---|---|---|---|---|
| Ink composition | Carboxylic acid group-modified self-dispersible carbon black (*1) | 7.0 | 6.0 | 6.0 | 6.0 |
|  | Glycerol | 23.0 | 23.0 | 23.0 | 23.0 |
|  | Dipropylene glycol-n-propyl ether | 2.0 | 2.0 | 2.0 | 2.0 |
|  | 1,2,3-benzotriazole | — | 0.1 | 0.3 | 0.1 |
|  | Water | balance | balance | balance | balance |
| Oxalate ion (ppm) |  | 38 | 19 | 19 | 38 |
| Ni—Co filter Ni elution amount (ppm) |  | 12 | 2 | 1 | 6 |
| Ni—Co filter Observation |  | G | G | G | G |
| Re-dispersion property |  | G | G | G | G |

|  |  | Ink No. EX. 9 | EX. 10 | EX. 11 |
|---|---|---|---|---|
| Ink composition | Carboxylic acid group-modified self-dispersible carbon black (*1) | 6.0 | 6.0 | 6.0 |
|  | Glycerol | 23.0 | 23.0 | 23.0 |
|  | Dipropylene glycol-n-propyl ether | 2.0 | 2.0 | 2.0 |
|  | 1,2,3-benzotriazole | 0.3 | 0.3 | — |
|  | Water | balance | balance | balance |
| Oxalate ion (ppm) |  | 38 | 1 | 0.2 |
| Ni—Co filter Ni elution amount (ppm) |  | 6 | 6 | 3 |
| Ni—Co filter Observation |  | G | G | G |
| Re-dispersion property |  | G | G | NG |

(*1): Prepared by the method described in PCT International Publication WO2006/066132; numerical values in the table each indicate pigment solid content amount.
The unit of the blending mount is % by weight.

TABLE 2

|  |  | Ink No. COM. EX. 1 | COM. EX. 2 | COM. EX. 3 |
|---|---|---|---|---|
| Ink Composition | Carboxylic acid group-modified self-dispersible carbon black (*1) | 6.0 | 6.0 | 6.0 |
|  | Sulfonate group-modified self-dispersible carbon black (*2) | — | — | — |
|  | Glycerol | 23.0 | 23.0 | 23.0 |
|  | Dipropylene glycol-n-propyl ether | 2.0 | 2.0 | 2.0 |
|  | 1,2,3-benzotriazole | — | — | — |
|  | Water | balance | balance | balance |
| Oxalate ion (ppm) |  | 52 | 100 | 150 |
| Ni—Co filter Ni elution amount (ppm) |  | 50 | 52 | 64 |
| Ni—Co filter |  | NG | NG | NG |

TABLE 2-continued

| | | REF. EX. 1 | REF. EX. 2 | REF. EX. 3 | REF. EX. 4 |
|---|---|---|---|---|---|
| Observation Re-dispersion property | | G | G | G | |
| | | Ink No. | | | |
| Ink Composition | Carboxylic acid group-modified self-dispersible carbon black (*1) | — | — | — | — |
| | Sulfonate group-modified self-dispersible carbon black (*2) | 6.0 | 6.0 | 6.0 | 6.0 |
| | Glycerol | 23.0 | 23.0 | 23.0 | 23.0 |
| | Dipropylene glycol-n-propyl ether | 2.0 | 2.0 | 2.0 | 2.0 |
| | 1,2,3-benzotriazole | — | — | — | — |
| | Water | balance | balance | balance | balance |
| Oxalate ion (ppm) | | 3 | 52 | 100 | 150 |
| Ni—Co filter Ni elution amount (ppm) | | 6 | 6 | 6 | 8 |
| Ni—Co filter Observation | | G | G | G | G |
| Re-dispersion property | | G | G | G | G |

(*1): Prepared by the method described in PCT International Publication WO2006/066132; numerical values in the table each indicate pigment solid content amount.
(*2): Prepared by the method described in PCT International Publication WO2006/066132; numerical values in the table each indicate pigment solid content amount.
The unit of the blending mount is % by weight.

As shown in TABLE 1, in Examples 1-11 in which the oxalate ion concentration was not more than 45 ppm, the Ni elution amount was small that was not more than 12 ppm and the results of immersion evaluation were also satisfactory. Further, in Examples 6-10 in which 1,2,3-benzotriazole was blended, the Ni elution amount was greatly reduced, and the results of immersion evaluation were also extremely satisfactory. Furthermore, in Examples 1-11 in which the oxalate ion concentration was 1 ppm to 45 ppm, not only the results of immersion evaluation but also the results of re-dispersion property of the ink were also satisfactory. On the other hand, in Comparative Examples 1-3 in which the oxalate ion concentration exceeded 45 ppm, the Ni elution amount was great that was not less than 50 ppm, and the results of immersion evaluation were also inferior. Further, in Reference Examples 1-4 in which the self-dispersible carbon black modified by the sulfonate group was used, the Ni elution amount was small that was not more than 8 ppm irrespective of the oxalate ion concentration, and the results of immersion evaluation were also satisfactory.

As described above, the water-based ink of the present teaching has the excellent water resistance and is capable of lowering or preventing the corrosion of metal member contacting with the water-based ink in the ink jet recording apparatus. The usage or application of the water-based ink of the present teaching is not specifically limited, and the water-based ink of the present teaching is widely applicable to a variety of kinds of ink-jet recording.

What is claimed is:

1. A water-based ink for inkjet recording comprising:
    a refined self-dispersible carbon black modified by carboxylic acid group, wherein the refining is effective to provide an oxalate ion concentration in the water-based ink of not more than 45 ppm by weight;
    water; and
    a water-soluble organic solvent.

2. The water-based ink for ink jet recording according to claim 1, wherein the refining is effective to provide an oxalate ion concentration in the water-based ink in an amount ranging from 1 ppm by weight to 45 ppm by weight.

3. The water based ink for ink jet recording according to claim 1, further comprising 1,2,3-benzotriazole.

4. The water based ink for ink jet recording according to claim 1, wherein the water based ink is discharged by an ink discharge mechanism including a metal member.

5. The water based ink for ink-jet recording according to claim 4, wherein the metal member contains nickel.

6. An ink cartridge comprising the water-based ink for ink-jet recording as defined in claim 1.

7. An ink jet recording apparatus, comprising:
    an ink cartridge accommodating section in which the ink cartridge as defined in claim 6 is accommodated;
    an ink discharge mechanism which discharges the water-based ink of the ink cartridge; and
    a metal member which contacts with the water-based ink.

8. The ink jet recording apparatus according to claim 7, wherein the metal member is included in the ink discharge mechanism.

9. The ink-jet recording apparatus according to claim 7, wherein the metal member contains nickel.

10. An ink-jet recording method which performs recording on a recording medium comprising:
    preparing the water-based ink for ink jet recording as defined in claim 1; and
    discharging the water-based ink to the recording medium.

11. The ink jet recording method according to claim 10, wherein the water-based ink is discharged to the recording medium by an ink discharge mechanism including a metal member.

12. A method for preventing corrosion of a metal member, of an ink jet recording apparatus, which contacts with a water-based ink for ink-jet recording, the method comprising:
    providing a refined carboxylic acid group-modified self-dispersible carbon black dispersion, wherein the refining is effective to provide an oxalate ion concentration in the water-based ink of not more than 45 ppm by weight; and
    preparing the water-based ink containing a self-dispersible carbon black modified by carboxylic acid group, water, and a water-soluble organic solvent; and
    bringing the water-based ink into contact with the metal member.

13. The method for preventing the corrosion of the metal member according to claim 12, wherein the refining is effective to provide an oxalate ion concentration in the water-based ink in an amount ranging from 1 ppm by weight to 45 ppm by weight.

14. The method for preventing the corrosion of the metal member according to claim 12, wherein the ink jet recording apparatus includes an ink discharge mechanism which discharges the water-based ink; and the metal member is included in the ink discharge mechanism.

15. The method for preventing the corrosion of the metal member according to claim 12, wherein the metal member contains nickel.

16. A method for producing a water-based ink for inkjet recording, the method comprising:
provingng a refined carboxylic acid group-modified self-dispersible carbon black dispersion, wherein the refining is effective to provide an oxalate ion concentration in the water-based ink of not more than 45 ppm by weight;
providing water and a water-soluble organic solvent, and
mixing the refined carboxylic acid group-modified self-dispersible carbon black dispersion, water, and the water-soluble organic solvent.

17. The method for producing the water-based ink for ink-jet recording according to claim 16, wherein the carboxylic acid group-modified self-dispersible carbon black dispersion is refined by performing ultrafiltration for the carboxylic acid group-modified self-dispersible carbon black dispersion so that the oxalate ion is contained in the water-based ink in an amount of not more than 45 ppm by weight.

18. The method for producing the water-based ink for ink-jet recording according to claim 16, wherein the carboxylic acid group-modified self-dispersible carbon black dispersion is refined by refining the carboxylic acid group-modified self-dispersible carbon black dispersion so that the oxalate ion is contained in the water-based ink in an amount ranging from 1 ppm by weight to 45 ppm by weight.

\* \* \* \* \*